Figure 6:
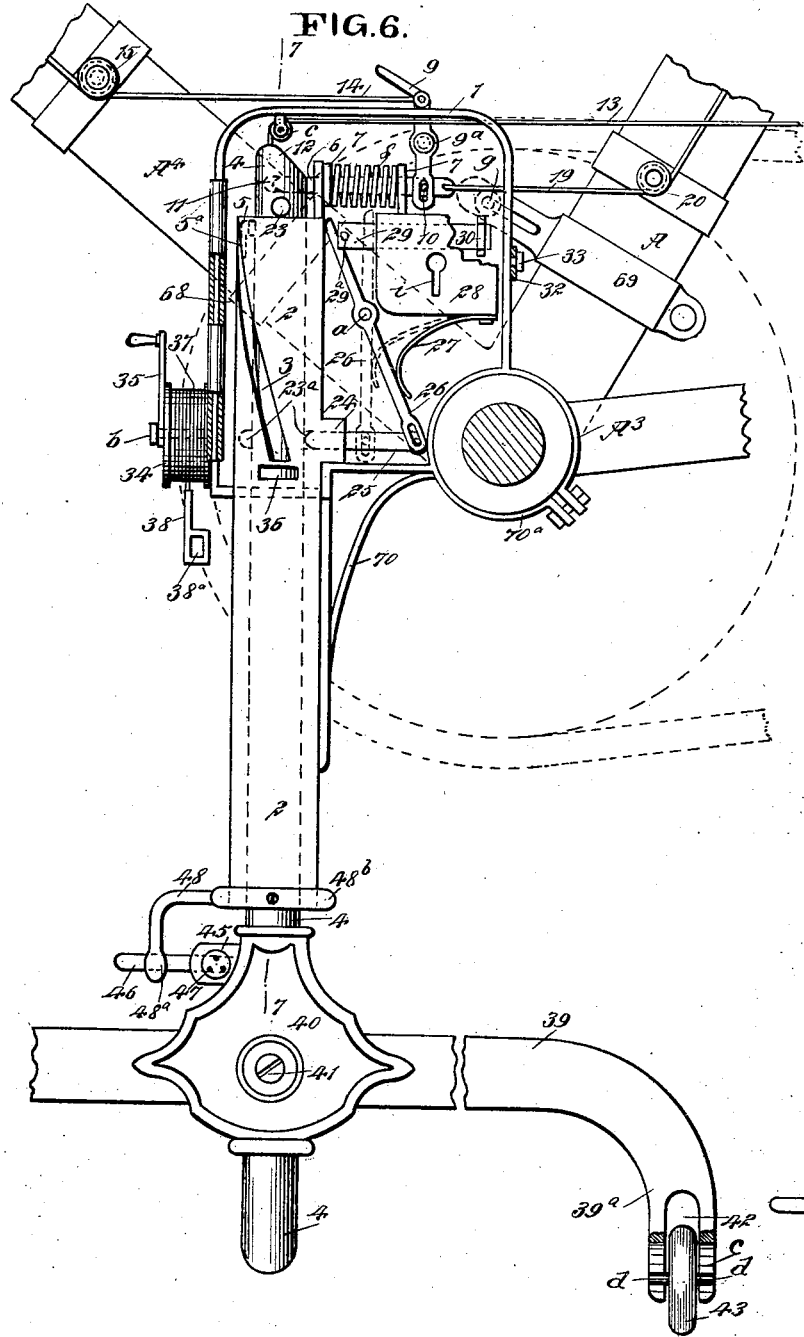

No. 643,936. Patented Feb. 20, 1900.
S. A. BHISE.
SUPPORT AND LOCKING DEVICE FOR BICYCLES.
(Application filed June 26, 1899.)
(No Model.) 2 Sheets—Sheet 1.
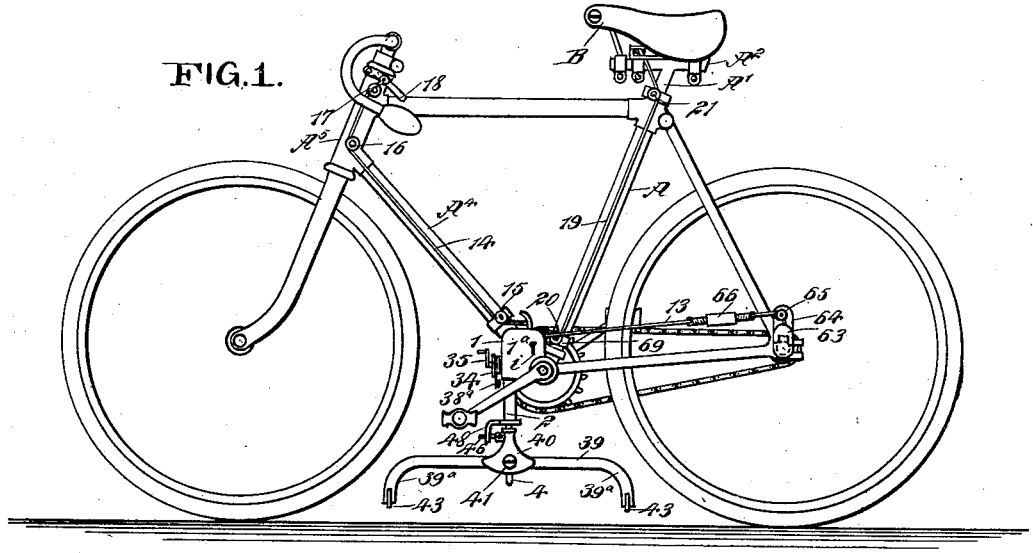
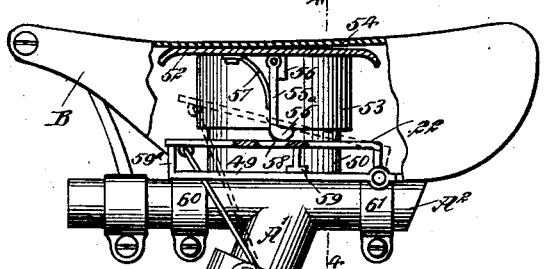
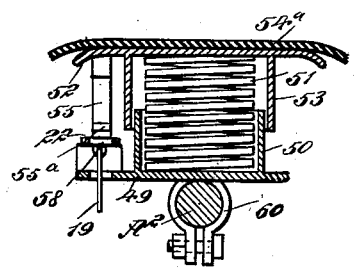
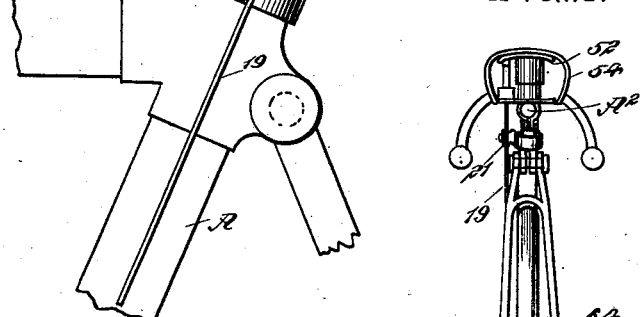
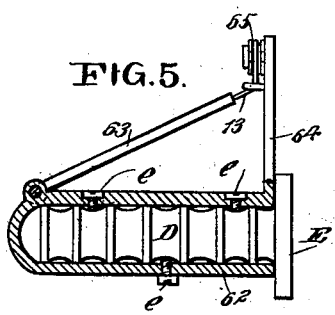
WITNESSES:
INVENTOR
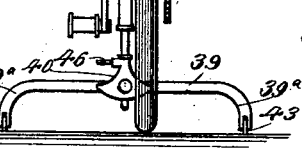
BY
ATTORNEYS No. 643,936. Patented Feb. 20, 1900.
S. A. BHISE.
SUPPORT AND LOCKING DEVICE FOR BICYCLES.
(Application filed June 26, 1899.)
(No Model.) 2 Sheets—Sheet 2.

WITNESSES:
Donn Twitchell
Wm. P. Patton

INVENTOR
Shanker A. Bhise
BY
Munn
ATTORNEYS

# UNITED STATES PATENT OFFICE.

SHANKER ABOJI BHISE, OF BOMBAY, INDIA.

SUPPORT AND LOCKING DEVICE FOR BICYCLES.

SPECIFICATION forming part of Letters Patent No. 643,936, dated February 20, 1900.

Application filed June 26, 1899. Serial No. 721,845. (No model.)

*To all whom it may concern:*

Be it known that I, SHANKER ABOJI BHISE, of Bombay, India, have invented a new and Improved Support and Locking Device for Bicycles, of which the following is a full, clear, and exact description.

This invention is a novel device for supporting a bicycle when it is not in use and for locking it while so supported, thus preventing improper removal.

The invention further provides simple and practical means for operating the supporting and locking mechanism of the bicycle automatically, to adjust the support for service, and also lock it while so adjusted.

The invention consists, essentially, in the novel construction and combination of parts, as is hereinafter described, and defined in the claims.

In the drawings forming a part of this specification similar characters of reference indicate corresponding parts in all the figures.

Figure 7:
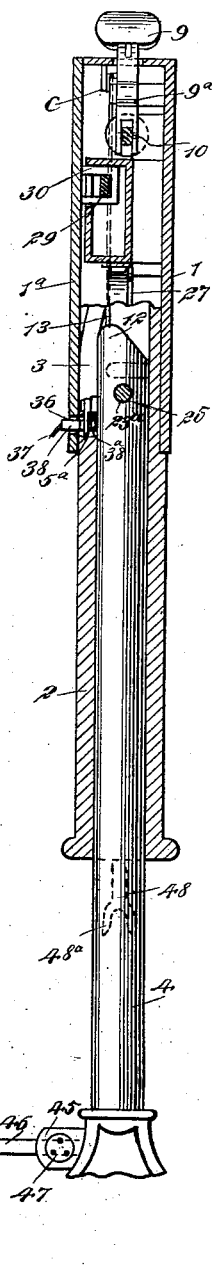

Figure 1 is a side elevation of a bicycle and of the improvements applied thereto that are adjusted to permit the use of the bicycle. Fig. 2 is a rear end elevation of the bicycle and the improvements, the latter being arranged to support the bicycle in an erect position. Fig. 3 is an enlarged and partly-sectional side view of the bicycle-saddle mounted on adjacent portions of the bicycle-frame and having features of the improvement connected therewith. Fig. 4 is a transverse sectional view of the saddle and its support, showing details of the improvement, partly in section, substantially on the line 4 4 in Fig. 3. Fig. 5 is a detached and enlarged detail of construction, partly in section, showing features of the invention applied to the foot-support of the bicycle used in mounting the same. Fig. 6 is an enlarged side view of the bicycle-frame in part adjacent to the spindle-supporting box and of main features of the improvement held upon the frame for service; and Fig. 7 is a transverse sectional view substantially on the line 7 7 in Fig. 6, but showing certain details differently adjusted from their arrangement as shown in Fig. 6.

In the embodiment of my invention as represented in the drawings the improvements are shown as applied upon a bicycle having a diamond frame, this vehicle being best adapted for the use of men; but it is to be understood that by slight changes in means for attaching the same the improvements may be readily applied upon a bicycle for women's use.

As indicated, A represents the rearwardly-inclined tubular frame member of the bicycle, wherein is supported the saddle-post A', having the horizontal top bar A², whereon is clipped the saddle B. The usual spindle-box A³ is united with the lower end of the tubular frame member A and likewise with the forwardly and upwardly inclined tubular frame-piece A⁴, that at the upper end joins the frame-sleeve A⁵, in which the front fork of the bicycle is swivel-supported. At the junction of the frame members A A⁴ with the spindle-box A³ the substantially-rectangular casing 1 is secured by clips or other means, said casing having a hinged door 1ᵃ, that when opened exposes interior parts from one side of the casing.

A guide-tube 2 depends from the casing 1, said tube at one side, near the upper end, having the slot 3 formed therein, which slot is longitudinal of the tube and extends spirally from the normal front thereof laterally and downwardly, the lower end being ninety degrees removed from the upper end, as indicated in Fig. 6. A cylindrical rod 4, which may be hollow or solid, is held to slide in the tube 2 and at the upper end is hung from the top of the casing 1, as will be hereinafter more fully described. A stud 5, having a depending tongue 5ᵃ, projects from the upper portion of the slide-rod 4, so that the tongue 5ᵃ may loosely engage with the slot 3.

A horizontal bolt 6, held to slide in bracket-ears 7, projecting from the side of the casing 1, is adapted to press toward the slide-rod 4 by means of the enveloping spring 8. The slidable movement of the bolt 6 is controlled by means of the lever 9, pivoted between its ends, as at 9ᵃ, upon the side of the casing 1, said lever having its upper end bent forward for pressure of the rider's foot and at its slotted lower end is pivoted by the pin 10 upon the rear end of the slide-bolt. There is a perforation 11 formed in the upper portion of the rod 4 to receive the forward end of the bolt 6, and the upper end of the rod 4 is sloped or cut on an incline, as at 12, to facilitate the retraction of the bolt 6 when the rod 4 is elevated, the entrance of the bolt within the perforation 11 serving to sustain the rod in elevated adjustment.

The rod 4 is raised by the flexible chain or wire cord 13, one end of which is affixed upon the upper end of said rod, as shown in Fig. 6, said flexible connection passing rearwardly through the casing 1 and receiving support from the small pulley $c$, as indicated in said figure. The device for operating said cord or chain will be hereinafter described.

Near the upper end of the bent lever 9 one end of a flexible connection 14 is secured, said cord or chain trending forwardly and upwardly and engaging the supported loose pulleys 15 16 17 and having its upper extremity secured upon the pivoted lever 18, held to rock on the upper portion of the front frame-fork near the handle-bar for easy manipulation by the rider, as shown in Fig. 1.

From the right-hand end of the slide-bolt 6 a flexible connection 19 extends rearwardly and upwardly and receives support from the loose pulleys 20 21, held to rotate on the frame member A, and at the upper extremity the flexible connection 19 is secured upon one end of the pivoted lever 22, as shown in Fig. 3.

In the upper portion of the slide-rod 4, below and near the perforation 11, a like perforation 23 is formed therein at right angles thereto, and at a suitable distance below the uppermost perforation 11 and in the same vertical plane therewith a perforation $23^a$ is transversely formed in a boss 24 on the tube 2. A locking-bolt 25 is held to slide in the horizontal perforation $23^a$ of the boss 24, said bolt being pivoted at its rear end upon the slotted lower end of a lever 26, pivoted between its ends, as at $a$, upon a projection from the side of the casing 1. Said lever being pressed by the spring 27, the bolt 25 is thus adapted to enter the lower perforation $23^a$ when free to do so.

A lock-case 28 is secured within the main casing 1 at a point below and near the upper slide-bolt 6, and a straight shackle-bolt 29 is held to slide in the case 28 near to and parallel with the upper side of said lock-case, preferably by a loop 30 near the rear end of the shackle-bolt and by the walls of a slot in the front face of the lock-case. At the forward end of the shackle-bolt 29 an open vertical slot or recess is formed, and a small pin-roller $29^a$ crosses said recess at a suitable distance from the forward end of the bolt, so that the upper portion of the rockable lever 26 may have an antifriction engagement within the recessed end of the shackle-bolt, as indicated in Fig. 6.

It should be explained that the loop 30 projects from the inner side of the door $1^a$ and in such relative position that when the door is closed said loop may receive the rear end of the shackle-bolt 29, if by a suitable key said bolt is caused to slide rearwardly, which will lock the door $1^a$ in closed adjustment. The door $1^a$ may also be temporarily held closed by a hook 32, that will engage with a loop 33 on the rear end wall of the casing 1. At the front of the casing 1 a drum 34 is supported upon a central stud $b$ for rotation by a crank-handle 35, and upon said drum one end of a chain or wire cord 37 is secured, and the main portion thereof is wrapped upon the drum by its rotatable movement. Upon the remaining end of the flexible chain or cord 37 a short shackle-bar 38 is secured by one end, as represented in Figs. 6 and 7, said bar having an eye $38^a$ formed in its free end, which latter is widened, so that said eye is formed on one edge of the bar, as clearly shown in Fig. 6.

A horizontal slot 36 is formed in the door $1^a$ near its lower edge and lies directly below the lower end of the twisted slot 3 in the tube 2, so that the tongue $5^a$, that depends in said slot from the upper portion of the slide-rod 4, will pass through the eye $38^a$, if the looped end of the shackle-bar 38 is entered within the slot 36 and the slide-rod is lowered a proper degree, thereby locking the free end of the chain 37 fast to the casing 1 and affording an additional securing device for the door $1^a$ of said casing.

A foot-bar 39, preferably of hard wood, having two arms $39^a$ of equal length bent on its ends in the same direction or at right angles to the bar, is secured in the bracket-head 40 by a screw 41, and in longitudinal slots 42, cut in the arms $39^a$ from their lower ends upward, two similar caster-wheels 43 are rotatably located. As shown in Fig. 6, where one of the caster-wheels appears, the journals $d$ on said wheel are held to slide in opposite slots $c$ in the depending limbs formed by the slot 42 and at right angles to said slot. It will be seen that the manner of connecting the caster-wheels 43 with the depending arms $39^a$ permits a limited play of the wheels on the arms, which will adapt the foot-bar to maintain a horizontal position on a rough road-bed.

Upon the upper portion of the bracket-head 40, and preferably at the front side thereof, a forwardly-projected bracket-arm 46 is held to rock in a slotted ear 45, said arm being adapted for adjustment in a vertical plane by means of the securing-bolt 47, that is preferably furnished with three socket-holes in the head thereof for the reception of a mating key, which will enable the owner or other authorized person to raise, lower, or remove the bracket-arm, as may be desired.

An L-shaped limb 48 projects from the front of the guide-tube 2, and at the lower end of said limb a furcation is produced, thus affording two spaced fingers 48ª, (shown by dotted lines in Fig. 7,) which will receive the arm 46 between them when the rod 4 is slid upwardly, and the foot-bar 39 is disposed longitudinally of the bicycle-frame and held from lateral vibration. If desired, the limb 48 may be adjusted for height to compensate for slight variations in height of the bicycle driving-gear from the ground by forming the collar 48ᵇ of the limb 48 as a loose ring and movably securing it upon the lower end of the guide tube or sleeve 2, as shown in Fig. 6.

In Fig. 3 it will be seen that on the head-bar A² of the saddle-post A' a bracket-plate 49 is held by the clips 60 61, so as to dispose it upon the upper side of said head-bar. One end of the lever 22, before mentioned, is bent at a right angle, and the lower end of this bent portion is pivoted upon the rear end of the plate 49. The lever 22 is supported parallel with the plate 49 by posts 59 59ª, that project up from the latter. A two-part spring-holding box is located between the saddle-top 54 and the bracket-plate 49, said box comprising the cylindrical section 50, attached upon the bracket-plate 49, and the cylindrical section 53, that is of sufficiently increased diameter to permit it to slide over the lower section 50. A coiled spring 51 of proper strength is held in this two-part box and presses upon the flat arched cap-plate 52 on the upper box-section 53, so that the cap-plate will have enforced engagement with the lower side of the leather top 54 of the saddle B, as clearly shown in Fig. 3.

In the space inclosed by the saddle top 54 and at one side of the spring-box 50 53 a hook-bar 55 is pivoted by its upper end upon the cap-plate 52, the hook-nose 55ª on the lower end of said depending hook-bar being adapted to pass down through a slot 58, formed in the lever 22. The end walls of the slot 58 are sloped downwardly and toward each other, thus enabling the free insertion and hooked engagement of the hook-nose 55ª with the rear lower edge of said slot, this engagement being effected when the rider is seated, and it will be seen that when the saddle B is not occupied the bent lever 22 will be rocked upwardly by stress of the spring 51, as indicated by dotted lines in Fig. 3.

As the upper extremity of the flexible connection 19 is attached to the forward end of the lever 22, it will be evident that the upward rocking movement of said lever will pull upon the chain 19, and this will slide the latch-bolt 6 rearwardly, so that if it has been entered in the perforation 11 for the retention of the slide-rod 4 in elevated adjustment the release of the slide-rod thus effected will permit it to drop by gravity, which will cause the tongue 5ª to downwardly traverse the slot 3 in the tube 2, and consequently give the slide-rod a quarter-turn movement as it descends, thereby disposing the foot-bar 39 transversely of the bicycle between the front and rear traction-wheels, as indicated in Fig. 2.

As shown in Figs. 2 and 5, the foot-rest D, that projects, as usual, from the left-hand side of the bicycle-frame, has a sleeve 62 mounted thereon and secured in place by the screws e, and from the upper side of the sleeve, at its inner end, a flat plate 64 projects up at the outer side of the frame-piece E. On the sleeve 62, at its outer end, one extremity of the treadle 63 is pivoted, the other end being attached to the rearward extremity of the flexible connection 13, that at its forward end is connected with the top of the slide-rod 4, as previously explained.

The rear end portion of the flexible connection 13 has a turnbuckle 66 introduced therein to permit the length of the same to be regulated as may be required for efficient operation of this device, and near the inner end of the treadle 63 the flexible connection 13 engages a loose pulley 65, held to rotate on the upright guard-plate 64, as shown in Fig. 5. It will be seen that if the length of the flexible connection 13 is correctly adjusted the drop of the slide-rod 4 will pull the treadle 63 so as to incline it upwardly, as represented in Fig. 5. Hence if foot-pressure is applied upon the treadle, as will occur when the rider mounts the bicycle, the consequent depression of the treadle will elevate the slide-rod 4 and lock the bolt 6 in the hole 11.

The preferred means for holding the casing 1 in place on the bicycle-frame consists of the clip 69, having a slotted arm engaged by a bolt and nut g on the wall of the casing, said clip being secured upon the frame member A, as shown in Fig. 6. The casing is further held in place by a bracket-plate 68, attached upon the forwardly-inclined frame member A⁴, and also by the angular bracket 70, secured upon the tube 2, which bracket is clipped at 70ª upon the spindle-box A³, these connections serving to join the bracket 70, tube 2, and casing 1 with the bicycle-frame in a very substantial manner.

The operation is essentially as follows: When the slide-rod 4 is released from the bolt 6, it falls by gravity and makes a quarter-revolution, due to the traverse in the slot 3 of the tongue 5ª. This will aline the perforations 23 23ª, respectively formed in the slide-rod 4 and tube 2, near the lower end of the latter, and thus permit the lower locking-bolt 25 to enter these alined perforations, and as the foot-bar 39, along with its casters 43, has been disposed transversely of the bicycle-frame and the casters in contact with the ground it will be seen that the described disposal of parts will lock the foot-bar 39 in lowered adjustment and prevent the progressive movement of the bicycle at high speed, the bicycle being then supported in an upright position, as shown in Fig. 2. The bracket-arm 46 may cross the path of the bicycle crank-arm when the foot-bar 39 is depressed and disposed transversely of the bicycle, which will prevent progressive movement of the latter until this adjustment is changed.

When it is desired to mount the bicycle, the rider places his left foot upon the treadle 63, which will rock downwardly and pull upon the cord or chain 13, that in turn will elevate the slide-rod 4, it being understood that before mounting the vehicle the rider retracts the lower bolt 25 by use of a proper key that is inserted in the lock 28, the manipulation of said key serving to press the shackle-bar 29 against the upper end of the rockable lever 26, so as to incline it forwardly at the upper end and draw the bolt 25 rearwardly in an obvious manner.

When the slide-rod 4 is fully elevated by the described means, the upper locking-bolt 6 will be spring-pressed into the perforation 11, and thus hold the rod 4 elevated, the upward movement thereof turning the same so that the foot-bar 39 will be held longitudinally of the frame of the bicycle and at a proper distance from the ground.

If the rider desires to temporarily support the bicycle in an erect position while mounted upon the saddle B, the slide-rod may be lowered by the use of the hand or foot applied, respectively, to the lever 18 or foot-lever 9. When the wheelman desires to stop on the road several times, it is of advantage to withdraw the lower locking-bolt 25 from the slide-rod 4 and hold it retracted by means of the lever 26, that is forwardly rocked by use of a key applied to the lock 28, which will throw the shackle bar or bolt 29 forwardly and secure it, this adjustment of parts permitting the rod 4 to be elevated and lowered if the levers 18 and treadle 63 are operated as hereinbefore explained.

When the lock 28 is changed in adjustment by a proper key, so as to slide the shackle-bolt 29 rearwardly and into the loop 30, that is on the door 1ª, it will be evident that the lowering of the slide-rod completely will allow the lower bolt 25 to lock the slide-rod in lowered condition and at the same time lock the door of the casing 1 to prevent tampering with interior mechanism for release of the rod 4 and foot-bar 39.

If it is desired to secure the bicycle to a post, a fence, or other stable object which will permit the passage of the flexible steel chain or wire rope 37 through an opening therein, the operator unwraps this flexible connection, and after passing the shackle-bar 38 thereon through apertures in a fence, for example, so that the chain 37 will be looped around a portion of said fence, then the free end of the chain may be extended to the opening 36, wherein the looped portion 38ª of the bar 38 is inserted, and into said loop the tongue 5ª is passed by dropping the slide-rod 4. This will serve to automatically lock the bicycle in an upright position and also secure it in a reliable manner to the fence or other fixed object that will receive the chain 37, as described.

It is claimed that the features of improvement may be applied upon bicycles of various makes, either for male or female use, without injuring the bicycle and be removed therefrom at will. It is furthermore evident that the improvements may be utilized advantageously for support of a bicycle indoors, as well as on the road, and thus dispense with the employment of a special stand for support of the bicycle. It is also claimed as features of advantage that the device is easily removed and taken to pieces for necessary repairs, that it is durable, and of simple construction.

Having thus described my invention, I claim as new and desire to secure by Letters Patent—

1. A bicycle support and locking device, comprising a slidably-held upright rod, a transverse foot-piece thereon, having depending limbs and casters thereon, means to turn the slide-rod a quarter-revolution when raised or lowered, a treadle device connected with the top of the slide-rod, which will elevate said rod by foot-pressure upon said treadle, an automatically-operative device for locking the rod elevated, and a device for release of said rod, operative by either hand or foot power.

2. The combination with a bicycle-frame, and a casing thereon having a depending tube, of a slide-rod in said tube, having a transverse foot-piece, means to lock the rod elevated, a manually-operative device for release of said rod to permit its descent by gravity, a flexible connection extending from the top of the slide-rod and a treadle on a foot-rest engaged with the lower end of the flexible connection which will raise said slide-rod when the treadle is depressed.

3. The combination with a bicycle-frame, a casing thereon, a depending tube having a twisted depending slot that extends one-quarter way around said tube, a slide-rod in said tube having a transverse foot-piece, a tongue on the slide-rod which will traverse the slot, and means to elevate the slide-rod by foot-pressure, of a flexible connection extended between a device near the bicycle-saddle and a slide-bolt that locks the slide-rod elevated, said device being adapted to release the slide-bolt from the rod when the saddle is unoccupied.

4. In a device of the character described, the combination with a slidably-held upright rod, a transverse foot-piece thereon, means to turn the slide-rod a quarter-revolution when raised or lowered, means to elevate the slide-rod, a slide-bolt that retains the slide-rod elevated, a foot-power treadle device for release of said slide-bolt to permit the slide-rod to descend by its gravity spring-pressed, a slide-bolt and a rockable lever engaging one end with the slide-bolt and at the upper end controlled by a lock and adapted to hold the slide-rod in lowered adjustment.

5. In a device of the character described, the combination with a slidably-supported rod having a tongue and a transversely-slotted tube that contains said slide-rod, of a reel on the bicycle-frame, a flexible connection wrapped on the reel for extension therefrom, and a shackle-bar, having a loop and secured on one end of said flexible connection, that will enter the transverse slot of the tube and be locked therein by the tongue on the slide-rod.

SHANKER ABOJI BHISE.

Witnesses:
S. COMFORT,
BEHRAMYD P. BHARUCHE.